(12) United States Patent
Schlummer et al.

(10) Patent No.: US 7,993,554 B2
(45) Date of Patent: Aug. 9, 2011

(54) METHOD FOR THE MANUFACTURE OF A MOLDING COMPOSITION

(75) Inventors: Christian Schlummer, Zürich (CH); Sasan Habibi-Naini, Rikon (CH)

(73) Assignee: Sulzer Chemtech AG, Winterthur (CH)

( * ) Notice: Subject to any disclaimer, the term of this patent is extended or adjusted under 35 U.S.C. 154(b) by 286 days.

(21) Appl. No.: 11/895,301

(22) Filed: Aug. 22, 2007

(65) Prior Publication Data
US 2008/0067719 A1    Mar. 20, 2008

(30) Foreign Application Priority Data

Aug. 23, 2006 (EP) .................................. 06119390

(51) Int. Cl.
B29C 44/34 (2006.01)
B29C 65/00 (2006.01)
B29C 44/46 (2006.01)
B29B 7/00 (2006.01)
B29C 44/20 (2006.01)
B29C 44/58 (2006.01)
A01J 17/00 (2006.01)
A23P 1/00 (2006.01)

(52) U.S. Cl. ............ 264/51; 264/41; 264/50; 264/328.1; 425/4 R; 425/4 C; 425/207; 425/542; 425/557; 425/817 R (58) Field of Classification Search ............... 264/328.1, 264/349, 41, 51; 425/208, 4 R, 542, 817 R
See application file for complete search history.

(56) References Cited

U.S. PATENT DOCUMENTS

| 2,848,739 | A |   | 8/1958 | Henning |
|---|---|---|---|---|
| 3,792,839 | A |   | 2/1974 | Gidge |
| 3,902,665 | A | * | 9/1975 | Hendry .................. 239/119 |
| 5,334,356 | A |   | 8/1994 | Baldwin |
| 5,935,490 | A |   | 8/1999 | Archbold |
| 6,203,188 | B1 |   | 3/2001 | Maurer |
| 6,231,942 | B1 | * | 5/2001 | Blizard et al. ............ 428/36.5 |
| 6,403,663 | B1 | * | 6/2002 | DeSimone et al. ......... 521/97 |

(Continued)

FOREIGN PATENT DOCUMENTS

GB    989855    4/1965

OTHER PUBLICATIONS peripherally, 1808, Merriam-Webster, http://www.merriam-webster.com/dictionary/peripherally.*

(Continued)

*Primary Examiner* — Christina Johnson
*Assistant Examiner* — Benjamin Schiffman
(74) *Attorney, Agent, or Firm* — Francis C. Hand; Carella, Byrne, Cecchi (57) ABSTRACT

A method for the manufacture of a molding composition from a raw material melt which is charged with an additive includes the steps: charging a conveyor apparatus with a raw material which includes a liquid or gooey pasty composition or a granulate; converting the raw material into a raw material melt by heat supply to the raw material; charging the raw material melt with an additive; mixing of the raw material melt with the additive to produce a molding composition; and discharging the molding composition from the conveyor apparatus. The charging of the raw material melt with the additive takes place through a metering device which is arranged in a passage section of the conveyor apparatus and/or subsequent to the conveyor apparatus with the raw material melt flowing through and/or around the passage section. The metering device includes at least one metering element which is arranged in a recess of the passage section.

15 Claims, 9 Drawing Sheets

U.S. PATENT DOCUMENTS

| | | | |
|---|---|---|---|
| 7,198,748 B2* | 4/2007 | Habibi-Naini et al. | 264/328.18 |
| 2004/0080065 A1* | 4/2004 | Kim | 264/40.1 |
| 2004/0145074 A1* | 7/2004 | Habibi-Naini et al. | 264/51 |
| 2005/0077641 A1* | 4/2005 | Schlummer | 264/51 |

OTHER PUBLICATIONS radially, 1570, Merriam-Webster, http://www.merriam-webster.com/dictionary/radially.*

* cited by examiner

METHOD FOR THE MANUFACTURE OF A MOLDING COMPOSITION

This invention relates to a method for the manufacture of a molding composition. More particularly, this invention relates to a method of metering additives continuously, quasi-continuously or discontinuously into a gooey, viscous or pasty composition, in particular into a plastic melt in the manufacture of a molding composition.

It is known from the prior art in accordance with DE 198 53 021 A1 to meter a physical foaming agent into a plasticised polymer in a screw cylinder. The screw then conveys the polymer foaming agent mixture into a so-called storage cylinder against a defined dynamic head. On completion of the metering phase, the melt is injected out of the storage cylinder into a cavity at high speed. The metered polymer volume injected into the cavity is lower than the volume of the cavity, which is characteristic for a low pressure process. In this case, the mould cavity is completely filled only by foaming the melt, with the foaming process being triggered by the pressure drop of the melt along the flow path. The internal tool pressures in this connection amount to less than 70 bar as a rule. A disadvantage of the low pressure process is the frequently poor surface quality of the manufactured moulded parts. To improve the surface quality, a so-called high pressure process can be used with internal tool pressures of 100 bar being used.

To improve the surface quality of the molded parts, it is therefore proposed in DE 198 53 021 A1 to use a high pressure process for the manufacture of foamed molded parts. In this process, the total tool cavity is filled with the melt/foaming agent mixture, with the tool volume being smaller than the volume of the molded part to be manufactured. In a holding pressure phase subsequent to the injection phase, the manufactured. In a holding pressure phase subsequent to the injection phase, the marginal layers of the molded part are compressed to manufacture a closed marginal layer. The foaming is initiated by the enlarging of the tool cavity. A high pressure process of this type works with an internal tool pressure of 100 bar. What is disadvantageous in this process is the necessity to have to use tools especially constructed for a specific product to achieve a good product quality. The mentioned enlargement of the tool cavity can be achieved by using an immersion edge tool or by drawing the core. The manufacture of tools of this type, in particular with moving inserts, requires high precision. A standard injection molding machine cannot be used for the manufacture of foamed thermoplastic molded parts while using so-called physical foaming agents without modifications since a pre-plasticising is required for the feed of the foaming agent into the melt. This melt charged with foaming agent is introduced into the tool by means of plunger injection. To introduce a physical foaming agent into the melt flow in a metered and homogeneous manner, in accordance with DE 198 53 021 A1 the polymer plasticised in the screw cylinder is guided through a ring gap around a torpedo which is centred in the melt passage and whose outer envelope is made of sintered metal. The outer boundary of the ring gap is formed by a cylinder which is likewise manufactured from sintered metal. The foaming agent can be introduced into the melt both via the porous outer envelope of the torpedo and via the sintered metal surface of the cylinder.

Instead of the torpedo shown in DE 198 53 021 A1, the feed of a physical foaming agent, in particular of a gaseous foaming agent, can take place via a cylinder which consists of a porous material and is installed between the plasticising cylinder and the shut-off nozzle of the injection moulding machine, as was shown in DE 101 50 329 A1. A static mixing element is arranged in the interior of the porous cylinder and has webs which extend into the melt passage and which provide a rearrangement of the melt and a mixing of the initially still inhomogeneous polymer/foaming agent system during the injection phase.

The use of the porous cylinder shown in DE 101 50 329 A1, which is held in a bore of the pressure chamber by means of the shut-off nozzle, is problematic in high pressure processes since the porous cylinder does not have sufficient pressure resistance.

The cylinder is tensioned by the internal pressure. The tension sigma on each of the end faces of the cylinder amounts to:

$$\text{Sigma} = \frac{p}{(r_a^2/r_i^2 - 1)}$$

The tension sigma in the jacket surface of the cylinder, in contrast, amounts to:

$$\text{Sigma} = \frac{p}{(r_a/r_i - 1)}$$

The porous cylinder in the arrangement shown in DE 101 50 329 A1 is now admittedly pre-stressed in compression by the end face mounting. However, since the largest tensile loading does not take place at the end faces at all, but along the jacket surface shown in section in DE 101 50 329 A1, the risk of failure of the cylinder due to a crack along just this jacket surface continues unabated when the internal pressure is increased. In addition, the cylinder is made up of a porous material, whereby the cylinder is only loadable by tension mechanically with restriction.

For this reason, the arrangement shown in DE 101 50 329 A1 is not suited, or is only suited to a limited extent, for the metering of an additive, in particular of a foaming agent, within the framework of a process in which a high operating pressure is present at least in that section in which the metering takes place. An embodiment in accordance with EP 06405129.5, in which a number of metering elements installed parallel to the main direction of flow are provided in the impregnation body for the enlargement of the feed surface for the foaming agent, is also in particular suitable for the use in a method in which the metering takes place at a low operating pressure. The metering elements are made substantially as porous hollow bodies through which the polymer melt flows. Static mixing elements can be provided at the interior of the hollow bodies which effect a homogenisation of the foaming agent over the total polymer strand flowing through the hollow body. Alternatively to a flow of the polymer strand through the hollow bodies, provision can also be made from the polymer to flow around the hollow bodies. The foaming agent which is fed into the polymer melt via the pores in the hollow body is disposed at the interior of the hollow body or bodies. The just described embodiment of the metering elements is only suitable with restrictions for both the low pressure methods and in particular also the high pressure methods since high injection pressures can occur in injection moulding processes, also at low cavity pressures, which can result in the failure of a metering element due to crack formation.

The fastening of the static mixing element to the inner wall of the porous cylinder represents a further unsolved problem. Additional strains are introduced into the cylinder jacket by the fastening of the mixing element or elements. The magnitude of these strains moreover varies periodically because a pressure drop of the melt plasticised under dynamic head occurs on the flowing of the melt into the tool cavity. Pressure fluctuations thereby occur which repeat with each injection cycle, whereby periodically fluctuating forces are introduced into the fastening elements of the static mixer on the porous cylinder not previously disclosed in the prior art.

A solution to problems of this type can be provided by the arrangement shown in WO 2004037510 A1 of metering elements for the charging of a polymer melt flow with a physical foaming agent. In the arrangement shown there, instead of a porous cylinder arranged subsequent to the reciprocating screw, a series of so-called dynamic mixing elements, that is mixing elements movable along with the reciprocating screw, are provided via which the foaming agent feed takes place simultaneously.

It has, however, been shown that the mixing effect of the mixing and metering elements is disadvantageous for shear-sensitive and dwell time-sensitive materials. For this reason, in accordance with EP 06405123.8, screw conveyors were used for materials of this type such as LSR (liquid silicon rubber) which only transport and do not homogenise or mix.

It is common to all metering elements working with hollow bodies for the feed of a foaming agent that they are only resistant to pressure strains with limitations.

It is the object of the invention to provide a method for the manufacture of a molded part which can be operated as a high pressure process for shear sensitive and dwell time sensitive media.

A method of this type for the manufacture of a molding composition from a raw material melt which is charged with an additive includes the steps:

charging a conveyor apparatus with a raw material which includes a liquid, viscous or gooey pasty composition or a granulate or an elastomer strip, with the conveyor apparatus in particular including a cylinder in whose interior space a conveyor means, in particular a screw is arranged;

plasticising and/or conversion of the raw material into a raw material melt;

charging of the raw material melt with an additive;

mixing of the raw material melt with the additive to produce a molding composition, with the molding composition being present as a homogeneous mixture of the raw material melt with the additive;

discharge of the molding composition from the conveyor apparatus.

The charging of the raw material melt with the additive takes place in a metering device which is arranged in a passage section of the conveyor apparatus and/or subsequent to the conveyor apparatus, with the raw material melt flowing through and/or around the passage section and the metering device including at least one metering element which is arranged in a recess of the passage section.

In an advantageous embodiment, the additive is fed into a ring passage via a passage, said ring passage being in communication with the metering element so that additive from the ring passage can enter through the metering element into the passage section filled with raw material melt and/or into the passage section around which raw material flows.

The metering device preferably contains a plurality of metering elements, with each metering element being completely surrounded by the basic material of the passage section so that the metering element is completely separated from the adjacent metering elements so that the feed of the additive takes place via discrete metering elements distributed over the periphery of the passage section.

The metering element can in particular be made up of a porous material. The porous material can be a metal or a ceramic material made in case form or pin form. Pins can in turn be inserted into the case contour and can also protrude in the passage the raw material melt flows through and is bounded by the passage sections to improve the mixing effect. The metering element can be jacketed or also be made as part of a static mixing element. The porosity is selected in accordance with the medium to be metered and the medium to be charged. A metering element can be provided with coatings to improve the mechanical material properties, on the one hand, and to improve the porous properties with respect to the medium flowing through, on the other hand.

The mixing of the additive with the raw material melt by at least one mixing element which can in particular be made as a static mixing element takes place in the passage section which forms the metering device and/or in at least one subsequent passage section.

The plasticising and/or the conversion of the raw material into a raw material melt takes place by heat supply to the raw material, in particular via a heating apparatus which is in particular arranged at the outer wall of the cylinder and/or by the feeding in of thermal energy by the extruder.

After the metering of the additive and after an intense mixing, the molding composition is either supplied to an injection moulding machine or is further processed in a continuous process, in particular an extrusion process, particularly preferably a blow extrusion process, an extrusion blow moulding process, a blow film extrusion process, a profile extrusion process, a film extrusion process, a tube extrusion process, a plate extrusion process or a foam extrusion process or a process for the manufacture of liquid silicon rubber (LSR). Alternatively, the molding composition can be processed to form a molded part in a combination process of an injection moulding process and an extrusion process, in particular in a shot-pot machine. The molding composition is processed continuously in an injection unit to form a strand or is injected batch-wise into a cavity of a molding tool to manufacture molded parts. The injection unit includes a compression space and/or a volume storage space in which a conveying piston is moved such that the size of the compression space and/or of the volume storage space is periodically changed.

At least one connection in which a metering of the molding composition takes place is provided subsequent to the metering device. The connection is in fluid contact with a conveyor piston movable to and fro in a conveyor cylinder so that a pressure can be built up in the molding composition. The speed of the injection of the molding composition into the cavity of a molding tool and/or the volume flow of the molding composition to be injected is controlled by means of a nozzle which is in particular made as a throttle nozzle.

A method for the manufacture of a foamed molded part in particular includes the steps: melting a polymer granulate in an extruder to form a raw material melt; conveying the raw material melt into the metering device; supplying an additive, in particular a foaming agent, to the raw material melt in the metering device; mixing the additive with the raw material melt, with the pressure being increased continuously during the mixing in that the melt is continuously conveyed towards a closed nozzle, in particular a needle-type shut-off nozzle, which closes an inlet opening into a cavity of a molding tool, with the nozzle opening or being opened on the reaching of the injection pressure to make the way free for the molding composition into the cavity until the molding composition fills the cavity and the pressure of the molding composition falls so far that the foaming agent dissolved in the molding composition expands and a foamed molded part is created. The additive includes a physical foaming agent which in particular enters into the metering device in a gaseous, liquid or over-critical state. The additive enters into a ring passage surrounding the metering device under pressure and is brought into contact with the raw material melt flowing past through metering elements which in particular contain capillaries or are made up of porous material.

The method is particularly useful for the manufacture of molded parts from LSR and/or for the manufacture of molded parts and/or films or strand material or hollow bodies from elastomers and/or from thermoplastics. A further possible use of the method relates to the wax foaming and or to the processing of foodstuffs, for example of chocolate.

The invention will be explained in the following with reference to the drawings wherein:

FIG. 4b illustrates a section normal to the main direction of flow of the metering device in accordance with FIG. 4a;

FIG. 5b illustrates a section normal to the main direction of flow of the metering device in accordance with FIG. 5a;

Figure 1:
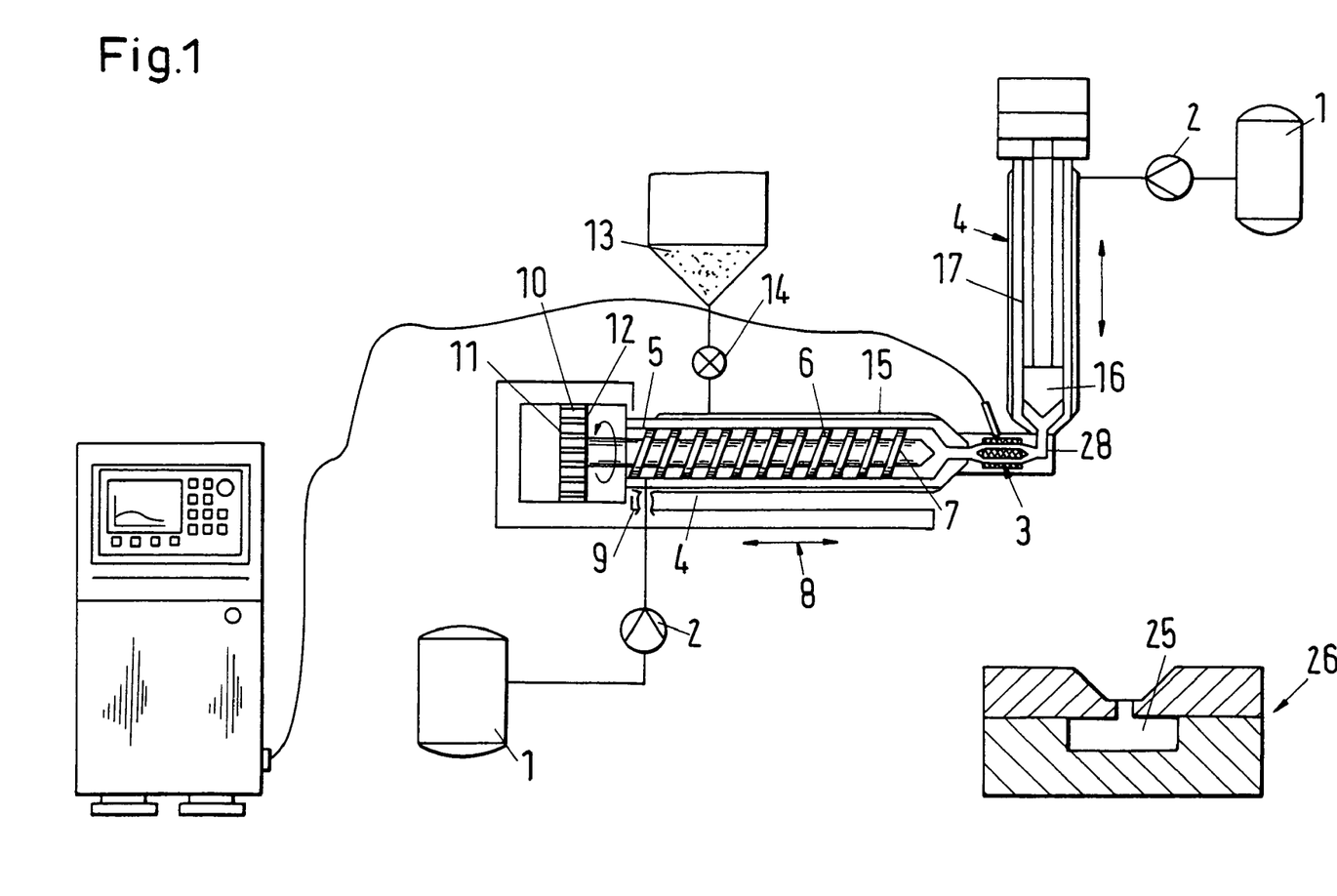
FIG. 1 illustrates a schematic view of an apparatus for the manufacture of a molded part from a liquid, viscous or pasty moulding composition in accordance with the invention.

Referring to FIG. 1, a first embodiment is shown for a device for the metering of a foaming agent into a liquid, viscous or pasty medium. The liquid medium is in particular a liquid of high viscosity such as a polymer melt.

A pasty medium includes an LSR polymer system, for example. LSR here stands for "liquid silicon rubber". LSR is a two-component polymer system whose components are not reactive individually and which is commercially available with properties which can be set in a predetermined manner. The LSR components are present as pasty compositions for processing to a molded part. They are combined to form a molding composition by means of special pumping, metering and mixing techniques. Vulcanisation reactions run in the molding composition by mixing the components and while increasing the temperature (150 to 200° C.). This reaction takes place, for example, as a platinum-catalysed addition vulcanisation in which a polysiloxane reacts with a vulcaniser consisting of short polymer chains and under the influence of the platinum catalyst. The vulcaniser and the catalyst are partial means for the carrying out of the vulcanisation reaction, with the two components forming a molding composition under the influence of the vulcanisation agent. In this process, the vulcaniser is supplied to the polysiloxane and to the Pt catalyst.

A further area of application is the processing of foamable polymer melts. A polymer melt of this type is usually obtained by heat supply from a granulate, with the granulate advantageously being conveyed by a cylinder, which is also called a plasticising cylinder in the literature, which is optionally equipped with heating apparatus. A granulate is usually converted into a melt, that is into a flowable medium, in the cylinder. There is added to the flowable medium an additive, that is a gaseous or liquid substance, which can in particular be a foaming agent, preferably a physical foaming agent, a dyestuff, a pharmaceutical active agent, a processing aid, a substance for the treatment of water, or also a filler such as chalk, talcum or a fibre material, in particular a long glass fibre, before said medium is continuously further processed as a moulding composition in an extrusion process or can be further processed batch-wise in an injection molding process to form an at least partly foamed molded part. In the following, a flowable medium, in particular a melt, to which an additive has already been mixed, shall be called a moulding composition.

This molding composition can be supplied to an injection molding machine to be injected into a mold having the dimensions of the molded part to be prepared and to be processed to form solid polymer molded parts. For the present case, an injection molding process should be considered as a discontinuous process since the metering of the molding composition into a cavity of a molding tool takes place discontinuously. In accordance with a further embodiment, the molding composition is only generated in the injection molding machine. In this case, the metering device is arranged directly in the injection molding machine. In this case, the metering of an additive can take place continuously so that the injection molding process for this application can be considered as a continuous process with respect to the action of the metering device.

Alternatively, the molding composition is further processed in a continuous process, for example in blow film extrusion, profile extrusion, film extrusion, tube extrusion, plate extrusion, in extrusion blow molding or in foam extrusion.

The metering device in accordance with the invention can also be used in a combination process which includes an injection molding process and an extruder. In particular a so-called "shot-pot" machine is used for a combination process of this type which is a combination of an extruder with an injection molding machine. In particular a physical foaming agent can be metered in and/or after the extruder by means of the metering device.

Shot-pot machines are used in the following applications, for example: injection molding of PET preforms, injection moulding of moulded parts with high shot weights, foam injection molding, IMC (injection molding compounder).

Shot-pot machines have the following advantages among others: the injection process can take place very precisely since only low process-initiated leakage flows arise. As a further consequence, high injection speeds can be realised. The injection unit in most cases includes a compression space and/or a volume storage space and a conveying piston for the compression and pushing out of the molding composition by which the size of the compression space and/or of the volume storage space is variable. The injection unit and the metering device are decoupled in shot-pot machines, whereby a double-screw extruder with high plasticising and with simultaneously low shear forces acting on the molding composition can, for example, be used with IMC. For this reason, shot-pot machines are suitable for materials which react sensitively to shear forces. A further advantage of the shot-pot machine is found in its suitability for the injection molding of foamed molded parts, foam injection moulding, which is due to the combination of an extruder with an injection moulding machine. A further advantage of the use of an extruder, in particular of a double-screw extruder, lies in that fact that a compounding can take place in the extruder. A combination of compounding and processing of the compounded composition to a molded part can thus take place with the shot-pot machine. An increased flexibility of the manufacture of molded parts is achieved by the combination of the two method steps in a shot-pot machine. The compounding can take place as required so that the dependence on the delivery of already compounded compositions is omitted. In addition, there is the risk that compounded compositions are exposed to ageing processes on storage because mixtures of this type are only storable to a limited extent depending on their composition.

A double-screw extruder is in particular used for the compounding by which low shear forces are introduced into the composition to be extruded or into the individual components to be extruded and mixed. Fibrous materials can advantageously also be mixed into the composition by means of a double-screw extruder, in particular fibres which are present as so-called rovings. The breakage and so the shortening of fibres is avoided to an increased degree by the low shear forces so that the average fibre length is substantially increased with respect to the prior art. As a consequence, improved strength values result for the fibre-reinforced composition since the material strength increases as the fibre length increases.

In accordance with an advantageous embodiment of a plant for the manufacture of molded parts from a plurality of components, two components in the case shown in FIG. 1, a reservoir 1 is provided for each of the components from which they are fed into a metering device 3 via a conveying apparatus 4. The conveying apparatus 4 of this type can incorporate a pump 2 and a cylinder 5 in which a rotatable screw 6 is disposed on a reciprocating screw 7. Conveying apparatuses of this type can be combined as desired in dependence on the number of components and their physical properties, in particular on their viscosity. The plant shown in FIG. 1 can be used for elastomer processing, particularly for the foaming of elastomers. In this application example, the total conveying apparatus can carry out to-and-fro movements, whereby the conveying apparatus can be coupled to and uncoupled from the other plant parts as desired. This to-and-fro movement is indicated by arrows 8.

In addition, the screw 6 and the reciprocating screw 7 can carry out an oscillation movement in the cylinder 5 for the improved conveying of a fluid, viscous, gooey or pasty composition. For the carrying out of an oscillation movement, the reciprocating screw 7 has a piston 10 with a cross-section enlarged relative to the cross-section of the reciprocating screw at the end at which an inlet stub 9 of the fluid or of the pasty composition is located. The two oppositely disposed end faces of the piston 10 can be acted on reciprocally by a pressure medium, whereby an oscillation movement can be generated in the reciprocating screw. A rotatable and/or oscillating reciprocating screw of this type is in particular used when the component to be conveyed is present as a gooey fluid or a viscous, pasty or flowable composition or as a granulate or as an elastomer strip.

A granulate or an elastomer strip is introduced via a seal pot 13 and a metering agent, such as a rotary valve 14, into the media space between the reciprocating screw 7 and the screw 5. The granulate or the elastomer strip is melted for further processing; for this reason, the cylinder 5 can have heating apparatuses 15.

If the fluid to be conveyed is already present in liquid form, a reciprocating screw can be eliminated. A simple conveyor piston 16, which is movably supported in an oscillating manner in a conveyor cylinder 17, serves for the conveying of a component of this type. For the temperature control and/or for the achieving of the feed temperature in the metering device, the conveyor cylinder can be equipped with a heating apparatus 18.

If the plant should be used for the manufacture of LSR, the components are polysiloxane with a vulcaniser consisting of short polymer chains. The additive in particular includes a foaming agent, such as $CO_2$, $N_2$, a hydrocarbon compound, such as pentane, or a mixture of the named gases.

Figure 2:
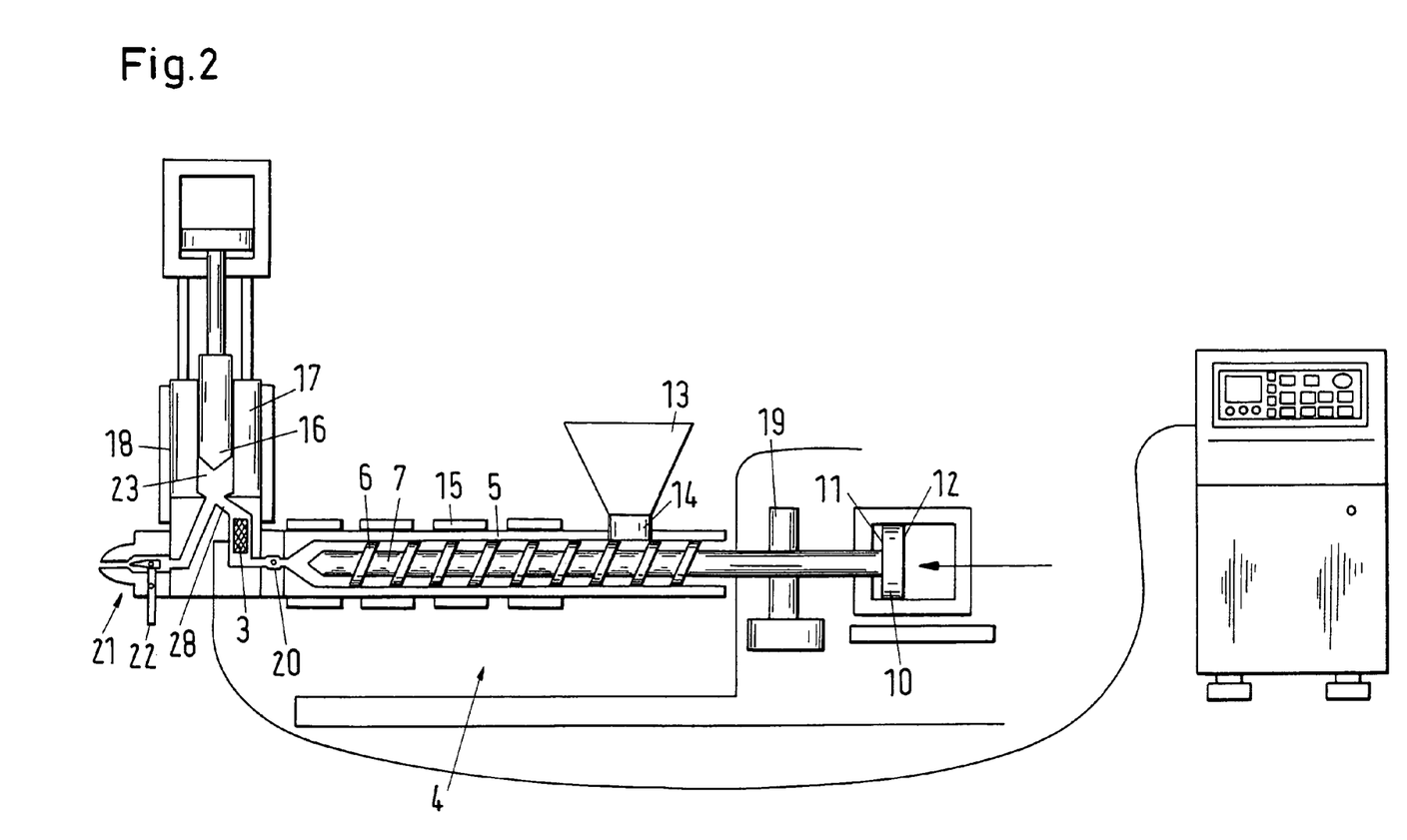
FIG. 2 illustrates a further embodiment of an apparatus for the manufacture of a molded part from a liquid, viscous or pasty moulding composition.

Referring to FIG. 2, in deviation from FIG. 1, a plant is shown for an extrusion of a gooey or viscous fluid or the processing of a raw material present in granulate form. The granulate can itself represent a mixture of a plurality of components. The granulates are frequently polymers which should not only be conveyed through the conveying apparatus 4 during the extrusion, but which should also be at least partly melted. For this purpose, the granulate is conveyed from a seal pot 13 via a metering agent, such as a rotary valve 14, into a cylinder 5 in which a reciprocating screw 7 provided with a screw 6 is located. The reciprocating screw 7 can be set into rotation by rotating means 19 and/or can be moved to and fro by oscillating drive means such as a piston 10 which can be acted on by pressure fluid. A piston of this type usually has a cross-sectional surface enlarged with respect to the reciprocating screw.

To convert a raw material present as a granulate into a melted state, a heating apparatus 15 is optionally provided depending on the position of the melting point of the granulate. The molding composition conveyed through the cylinder 5 is subsequently conveyed into a metering device 3 via a passage optionally provided with a shut-off means 20. The shut-off means 20 can, for example, include a check valve. As already stated with respect to FIG. 1, the addition of an additive such as a foaming agent takes place in the metering device 3. If the additive to be mixed in is a foaming agent, shut-off means must generally be provided to avoid an unmixing. The pressure in the moulding composition can be regulated by the use of shut-off means such that unwanted unmixing processes can be avoided; the molding composition can in particular be maintained at a pressure at which it is ensured that the foaming agent is present in the moulding composition in dissolved form.

The shut-off means 20 can be omitted if a vulcanisation, a mixing in of paints, flame retardants or the like should take place in the plant. Additives of this type remain in a mixed state after the mixing process so that the function of the shut-off means of maintaining a defined pressure in the molding composition is eliminated.

In contrast to the variant shown in FIG. 1, in accordance with the embodiment of FIG. 2, the melt containing an additive is compressed in a compression space and/or a volume storage space 23. This increase in pressure is to avoid unmixing processes and/or a premature foaming by a foaming agent contained in the melt. For the compression, a conveying piston 16 to which the function of a pressure balance piston can also accrue can be used for the pressure build up in the melt. The compressed melt is then discharged through a nozzle 21.

The metering device 3 is arranged between the shut-off means 20 and the compression/volume storage space in FIG. 2. The metering of the additive can thus take place at a higher pressure than the conveying pressure of the melt in the cylinder 5. It is ensured by the arrangement of a static mixing element 24 in the metering device 3 that, on the one hand, the supplied additive is mixed completely and uniformly with the molding composition and, on the other hand, that the mixing takes place continuously and completely.

After the exit from the metering device 3, a melt is present in which the additive, that is in particular a gaseous or highly volatile foaming agent, is present in a dissolved form. Unmixing processes with components which are difficult to mix having physical properties which differ greatly from one another can be as good as precluded in the compression space since the additive remains in the dissolved state in the melt due to the high pressure. The melt exits the compression space 23 via the nozzle 21.

In particular on the use of gaseous, liquid or over-critical additives such as physical foaming agents, the tendency to unmixing increases as the pressure falls since the diffusion speed of the foaming agent bubbles increases. The formation of a foamed molding composition with a defined, homogeneous foam structure can thus take place after the exit of the melt from the nozzle by setting the pressure and/or the temperature. In an extrusion process, the melt exits the nozzle 21 continuously so that a tubular, strand-like or thread-like extrusion product can be obtained.

The plant used is also suitable for use in one of the previously named extrusion processes. The nozzle 21 shown in FIG. 2 contains, for this purpose, a gas nozzle 22 which is arranged concentrically in the flow passage and through which a gas can be fed into the compressed polymer melt so that a cavity is formed at the interior of the polymer melt which increases after exiting the nozzle such that a tubular product, that is a product of tube form with a hollow core, arises.

If a shut-off means is used in the nozzle 21 instead of or in addition to the gas nozzle 22, the plant can be used in the same manner for the discontinuous manufacture of molded parts in an injection moulding process.

The molding composition exiting the metering device 3 is injected into a cavity 25 of a molding tool 26 (See FIG. 1), with a lowering of the pressure occurring. In apparatus terms, the mixed molding composition runs through a connection device after exiting the mixing device, with a metering of the molding composition taking place by means of said connection device. This connection device can include the conveying piston 16 shown in FIG. 2 which cannot only be used as a pressure balance piston, but also to build up pressure in the melt downstream of the shut-off means 20. A space to be filled by a defined melt volume which serves the metering of the molding composition arises by displacement of the conveying piston. The piston space can therefore serve as a metering device provided for an injection moulding process for the metering of a melt volume specific to the molding tool. This metering device can furthermore include a nozzle, in particular a throttle nozzle. The injected volume flow as well as the speed of the injection into a cavity of the injection molding tool can be controlled by the throttle nozzle. The cavity can be heated to accelerate the vulcanisation reactions.

Figure 3:
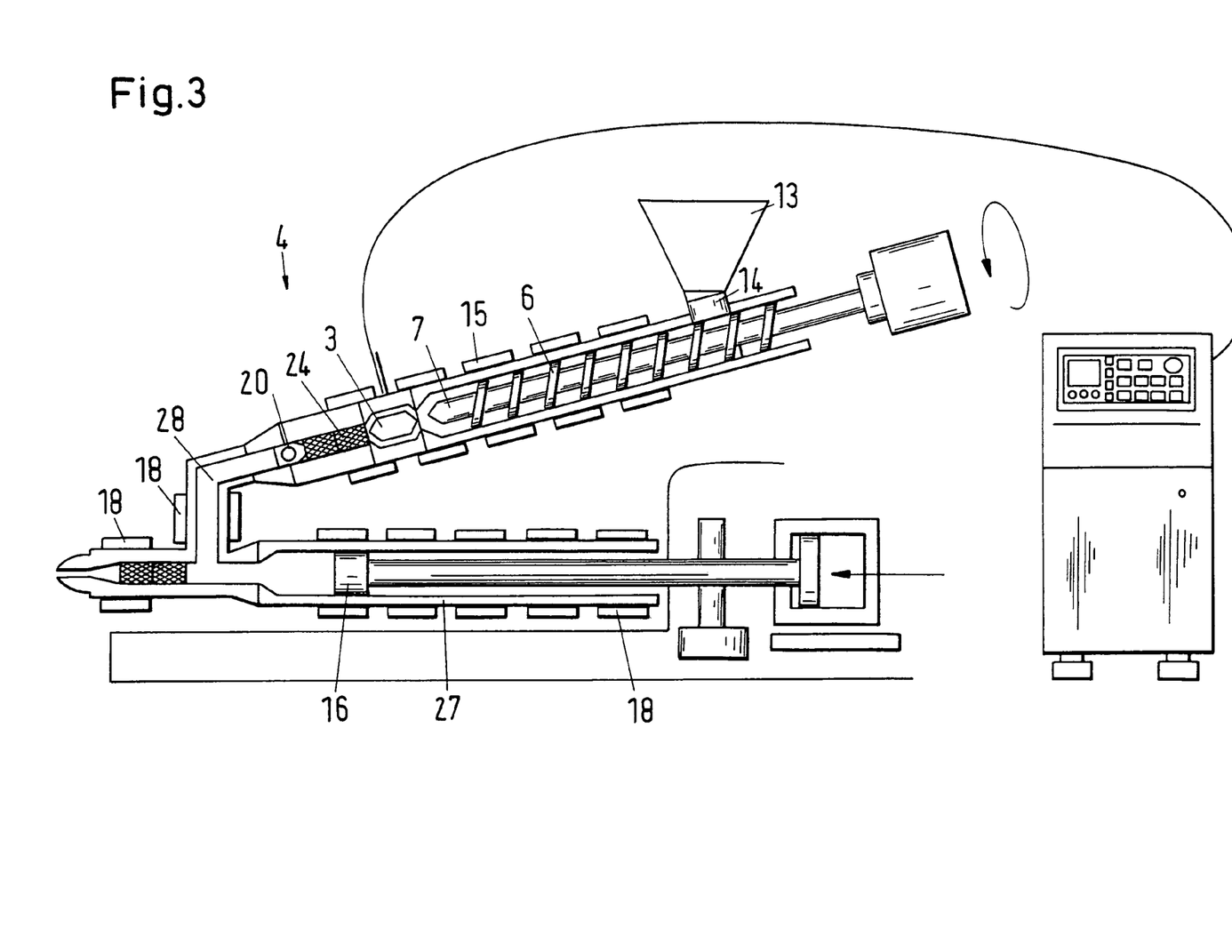
FIG. 3 illustrates a third embodiment of an apparatus for the manufacture of a molded part from a liquid, viscous or pasty moulding composition.

Referring to FIG. 3, wherein like reference characters indicate like parts as above, a third embodiment is shown for a plant having a metering device for an additive, in particular a foaming agent, into a liquid or pasty medium. The liquid medium can in particular be a liquid of high viscosity such as a polymer melt, with the polymer melt in particular being able to be used in a plant for the production of a foamed molded part. A conveying apparatus 4 similar to the conveying apparatus shown in FIG. 1 serves for the liquefaction of a polymer present as a granulate, with the conveying apparatus in particular being able to be formed as an extruder. In deviation from FIG. 1, the conveying apparatus 4 is usually not designed for an oscillation movement, but carries out a rotary movement around the common axis of the cylinder 5 and reciprocating screw 6. An oscillating movement of the screw and/or reciprocating screw 6 is advantageous when a molding composition has to be metered into an injection molding machine.

After melting in the cylinder 5, the liquefied polymer enters into a metering device 3 in which an additive is mixed in with the melt present as a liquid or pasty composition. Subsequent to the metering device 3, at least one static mixing element 24 is arranged in the flow path of the molding composition charged with the additive, whereby a homogeneous distribution of the additive in the melt flow can be realised. Minimal shear forces are introduced into the melt by the static mixing element 24 with a suitable design, in particular in accordance with one of FIG. 4a to FIG. 7.

The molding composition exiting the mixing element 24 is introduced into a compression space and/or volume storage space for the increase of pressure and/or for the metering, the volume of said compression space and/or volume storage space being variable by a conveyor piston 16 which can move to and fro in an injection cylinder 27 set up similar to the conveyor cylinder 17 shown in FIG. 2. For the temperature control of the molding composition, the injection cylinder 27 can be designed with heating apparatuses 18 over at least some of the enclosed volume.

The connection passage 28 shown in FIG. 3 for the conveying of the molding composition from the shut-off means 20 up to and into the compression storage space and/or volume storage space can likewise be provided with a heating apparatus 18 if a significant temperature drop of the molding composition can be determined over the passage length.

The total conveying apparatus 4 can also be retrofitted after the putting into operation of an injection molding machine or of an extruder. The metering device 3 as well as each mixing element 24 can also be retrofitted in the same manner since the cylinder 5 with the associated screw 6, the metering device 3 and each mixing element 24 represent an independent module.

In addition, the conveying apparatus 4 and the metering device 3 for a further component to be metered can also be attached subsequently to a connection passage 28 which is made as a so-called sleeping tube. A connection passage or connection tube which does not satisfy any technical process object in the running process is generally termed a sleeping tube. Alternatively, it is possible also to extend the concept of modularity to the connection passage 28 so that the connection passage 28 can be replaced in a simple manner by a connection passage having at least one additional connection stub. Any desired combinations of the aforesaid modules can then be docked onto a connection stub of this type.

Figure 4A:
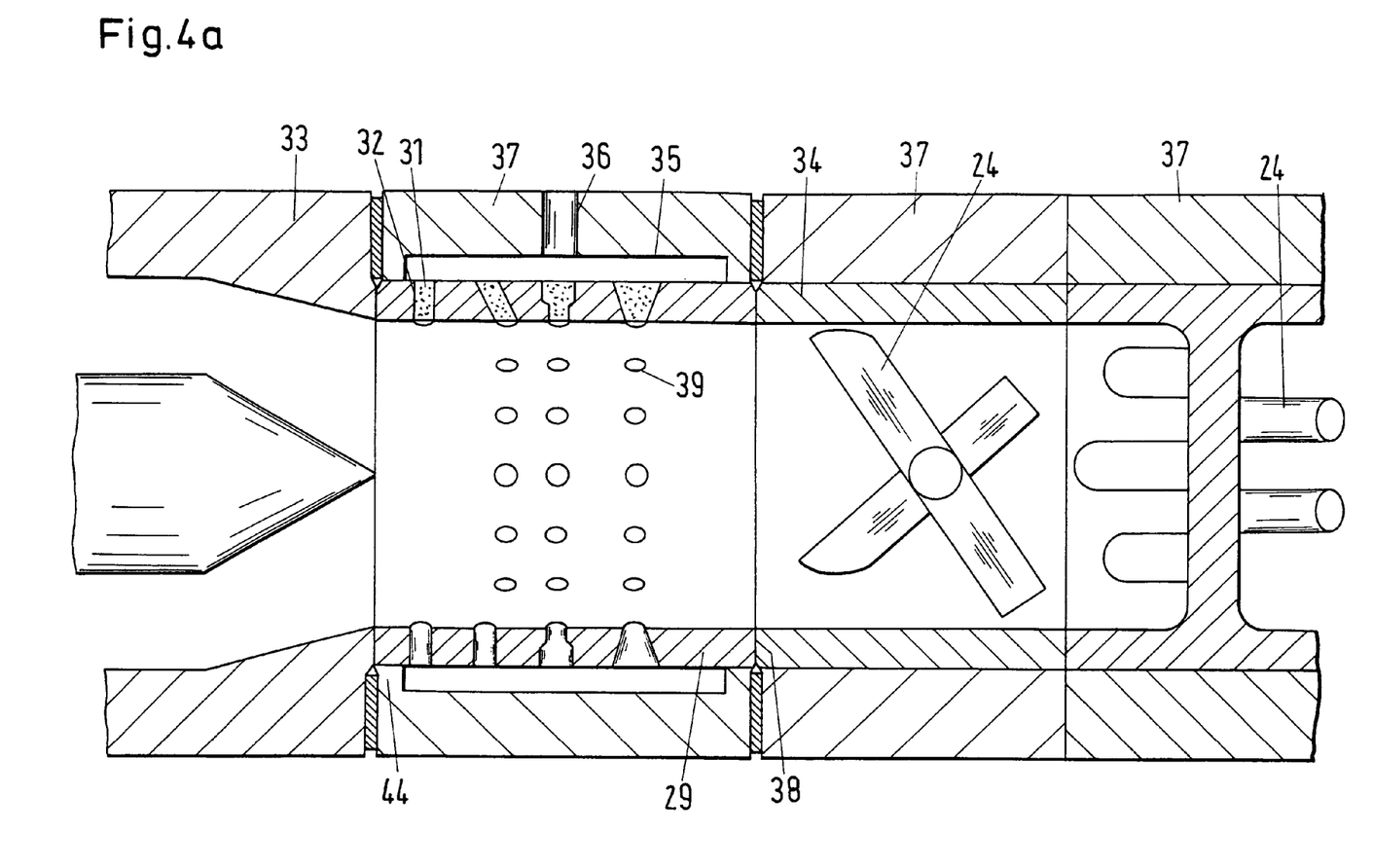
FIG. 4a illustrates a longitudinal section of a first embodiment of a metering device for metering additives into viscous fluids or pasty compositions in accordance with the invention.

Referring to FIG. 4a, there is shown a longitudinal section of a first embodiment of a metering device of additives to gooey or viscous fluids or pasty compositions. The metering device 3 includes a first passage section 29 which receives the fluid or flowable pasty composition, with the fluid flowing through the passage section 29. The fluid receiving passage section 29 can be a passage section in particular designed as a tube.

The passage section 29 through which flow takes place or which receives a fluid contains at least one metering element 31. The fluid receiving passage section consists of a material with good strength properties. A plurality of passage sections of this type can be connected in series if different additives are to be mixed in. Each of the passage sections 29 can contain a recess 32 for the reception of the metering element 31, with the recess being bounded at all sides by the material of the passage section 29 and the metering element 31 being held in the recess. The impregnation of at least one of the components of the fluid or flowable pasty composition with an additive, for example a foaming agent, in particular a physical foaming agent, takes place in the metering device.

The additive is fed into the metering device 3 under pressure via at least one passage 36 for the additive supply. The metering device includes a flow passage 35 which can in particular be made as a ring passage (i.e. an annular passage) and which serves for the distribution of the additive supplied via the passage 36 over the passage section 29. The flow passage 35 is made as a recess at the inner wall of the housing section 37 or as a recess on the outer wall of the passage section 29, with the housing section surrounding the passage section 29 over its full periphery. The housing section 37 is equipped with projections 44 which are supported in a fluid-sealing manner on the passage section 29. Optionally required sealing elements in the projections 44 are not shown, with a joint connection, in particular by a sealing weld connection or solder connection, also being able to be provided as an alternative.

The additive fed into the ring passage 35 through the passage 36 subsequently enters via the metering elements 31 into the flow passage through which the fluid or pasty composition flows and which is surrounded by the passage section 29. The additive then comes into contact with the fluid or pasty composition flowing at the interior of the passage section 29 through a porous surface which can also be designed as a porous case, in particular as a porous cylinder in accordance with EP 06450123.8, at low pressures and can be made as the previously designed passage section 29 with metering elements at higher pressures which in particular lie at a maximum of 300 bar, preferably at a maximum of 200 bar, in a process for the processing of LSR. Possible construction designs of the metering device shall be looked at in detail in the following.

The passage section 29 or an adjacent passage section (33, 34) can contain a static mixing element 24 for the better and faster mixing and homogenisation of the mixture of fluid, viscous or pasty composition and additive. As shown in FIG. 4a, the mixing element 24 can be located in at least one passage section 34 disposed downstream of the passage section 29. A plurality of passage sections 29 with corresponding housing sections 37 can be arranged as desired in rows in any sequence which is adapted to the respective mixing object, since they are also made up in a modular manner.

It is shown in FIG. 4a that subsequent to the impregnation step, that is to the supply of the additive to the flowing fluid or pasty composition, which was carried out in the just described metering device, the molding composition created in this manner is conveyed into a passage section 34 which is disposed downstream and contains the static mixing element 24. In the static mixing element, the molding composition flow can be divided, recombined and be rearranged by sequential connection of at least one further mixing element which is rotated by an angle with respect to the preceding mixing element. A homogenisation of the additive in the molding composition takes place by a plurality of mixing elements 24 which are arranged sequentially in the molding composition flow and are each arranged at angles offset to one another so that a molding composition uniformly charged with additive is present after leaving the mixing path. A particularly good homogenisation has been achieved with mixing elements offset to one another at an angle of 90°. The static mixing element 24 can be made as part of a passage section (29, 33, 34); in particular, the mixing element and the passage section are made as a cast part, are welded, soldered or connected in a shape matched manner.

Figure 4B:
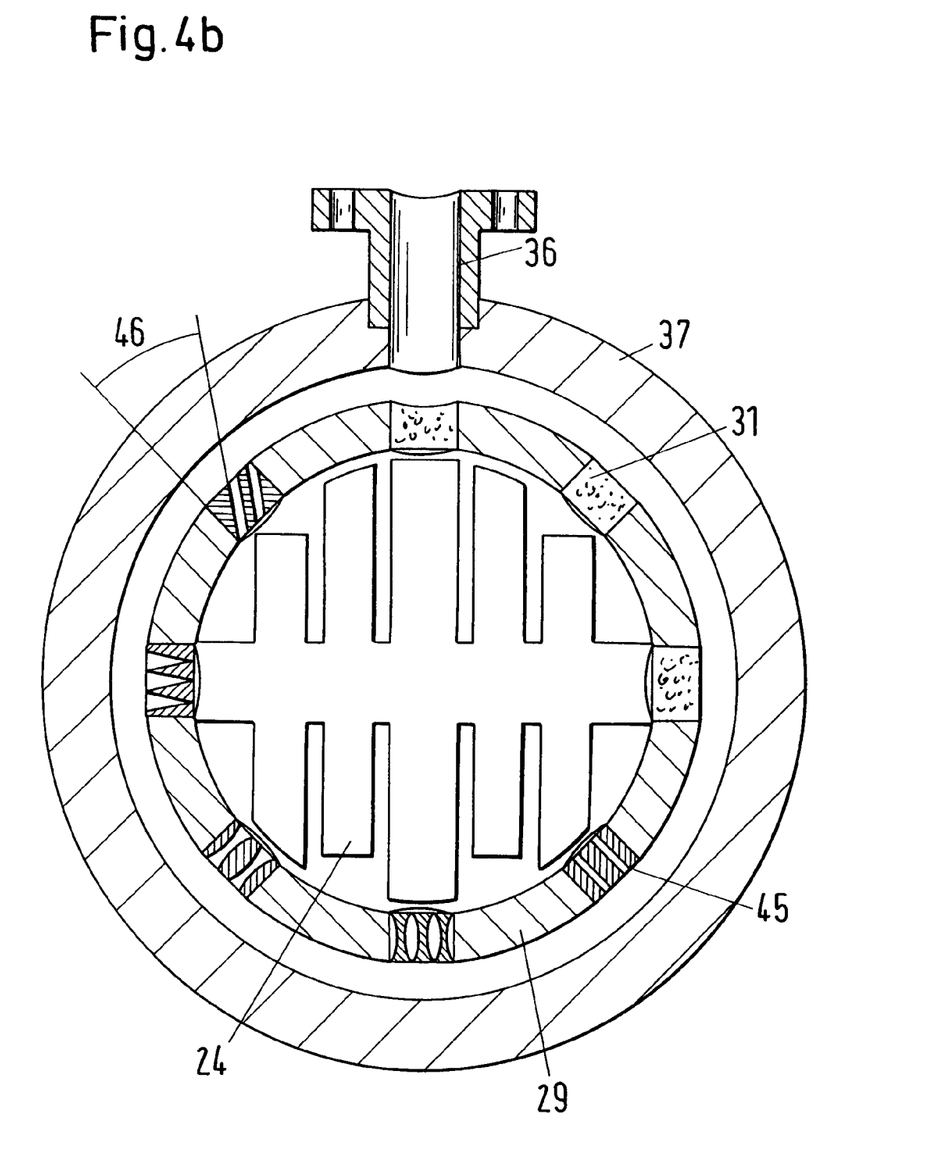

Referring to FIG. 4b, the metering elements 31 have capillary-like openings 45 that extend from the ring passage 36 up to the flow passage in which the fluid or pasty composition to be charged is disposed. In FIG. 4b, different possible aspects of the capillary-like openings are shown, namely with a cross-section remaining substantially constant over the passage length of the opening, with cross-sections which constrict and/or expand, with in particular nozzle-shaped cross-sections resulting in a feed with an increased flow speed. Cross-sections which are made with central or marginal expansion can facilitate the feed of the additive in drop shape. The design of the openings should not be restricted to the embodiments shown by way of example. Capillary openings can in particular be provided whose axis is not normal to the main direction of flow, but is inclined at an angle 46. A tangential feed of the additive can take place by an inclination in the sectional plane shown in FIG. 4b; alternatively or additionally to this, an inclination of the axis of the opening 45 or of the total metering element 31 relative to the main direction of flow can be provided, as was shown in FIG. 4a. Crystals with nanocapillaries can in particular be used for these capillaries.

Figure 5A:
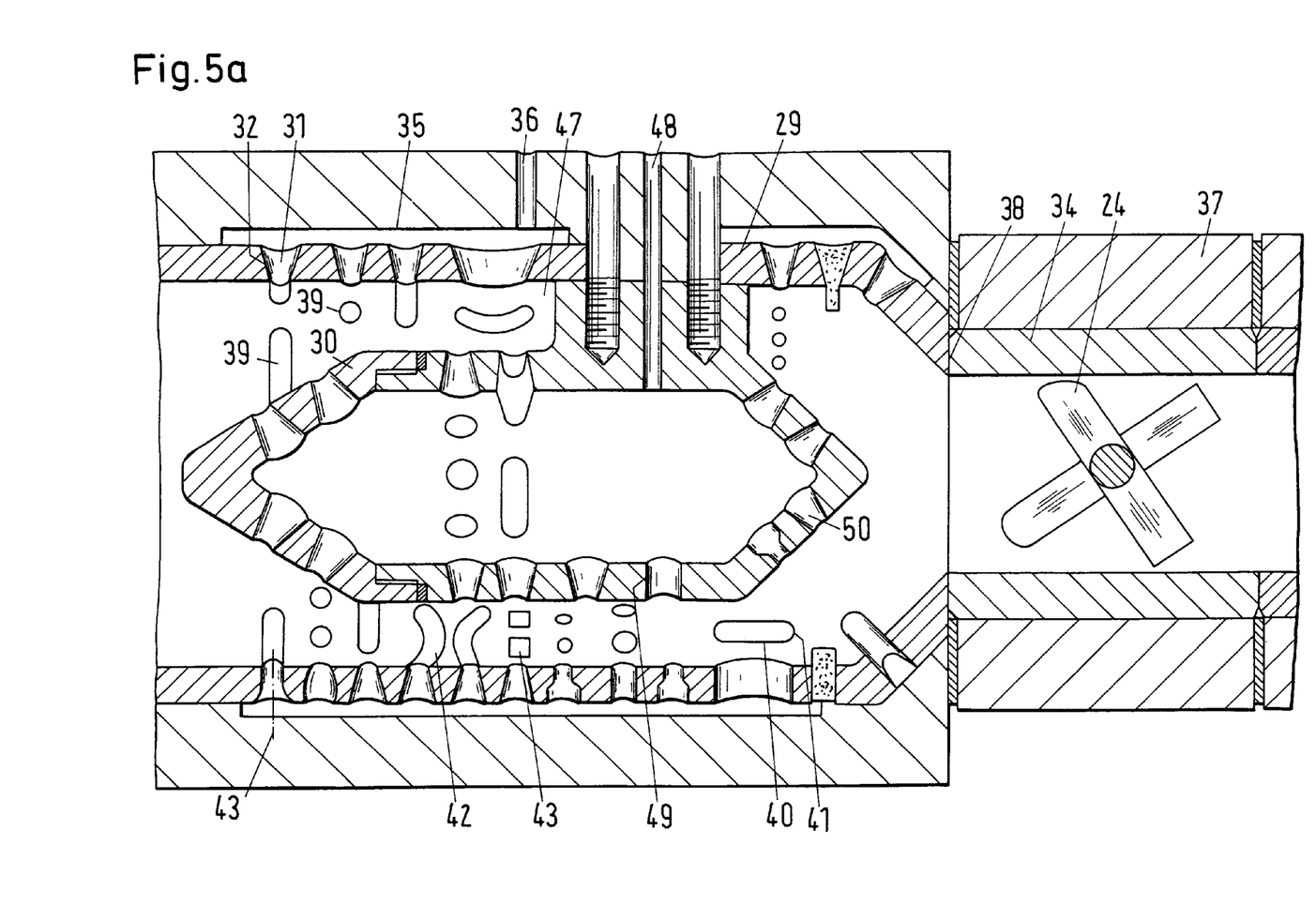
FIG. 5a illustrates a second embodiment of a metering device with a ring gap.

Referring to FIG. 5a, wherein like reference characters indicate like parts as above, the metering device 3 with a flow passage for a fluid, viscous or pasty composition is made as a ring gap 47. The ring gap 47 is formed by a passage section 30 around which fluid flows and which is built into the fluid receiving passage section 29. The metering device 3 includes a first passage section 29 receiving the fluid, viscous or flowable pasty composition, with the fluid flowing through the passage section 29 and a further passage section 30 around which the fluid or flowable viscous pasty composition can flow. The fluid receiving passage section 29 can be a passage section in particular designed as a cylinder tube. The passage section 30 around which fluid flows can in particular have a cross-sectional development corresponding to the fluid receiving passage section 29 so that the flow speed in the ring gap is substantially constant. The passage sections (29, 30) through and/or around which flow takes place contain at least one metering element 31. The fluid receiving passage section and the passage section around which fluid flows consist of a pressure-resistant material.

Each of the passage sections (29, 30) can contain a recess 32 for the reception of the metering element, with the recess being bounded at all sides by the material of the passage section (29, 30) and the metering element being held in the recess. The impregnation of at least one of the components of the fluid or flowable pasty composition with an additive, in particular a physical foaming agent, takes place in the metering device 3. The additive is fed into the metering device 3 under pressure via at least one passage 36 for the additive supply.

The metering device 3 includes a flow passage 35 which can in particular be made as a ring passage and which serves for the distribution of the additive supplied via the passage 36 over the passage section 29. As in FIG. 4a, the flow passage 35 is made as a recess at the inner wall of the housing section 37, with the housing section surrounding the passage section 29 over the full periphery.

A further passage 48 is provided to convey additive into the interior of the passage section 30.

The additive fed through the passage 36 into the ring passage 35 and via the passage 48 into a cavity 49 of the passage section 30 subsequently enters the flow passage through which the fluid or pasty composition flows and which is surrounded by the passage section 29 via the metering elements 31.

In FIG. 5a, different possibilities for the design of the metering elements and of the recesses are shown by way of example. The selection of the metering element in the suitable form can vary depending on the additive used. The use of shapes with a substantially circular feed cross-section 39 is used in particular for gaseous or highly volatile additives which should be introduced into the fluid or pasty composition uniformly over the total surface of the passage section. With their small dimensions relative to the surface of the passage section, the base material of the passage section is not substantially weakened so that this embodiment is in particular suitable for high pressure processes with pressures up to 1000 bar. It is important here that, unlike a sieve structure such as occurs in a passage section made completely from porous material, i.e. a porous case, the metering elements have a spacing from one another at least of equal size to their maximum diameter. The spacing of two adjacent metering elements advantageously amounts to 1 to 1.8 times their diameter, in particular to 1 to 1.6 times their diameter, particularly preferably 1 to 1.5 times their diameter.

In accordance with a further embodiment, the metering element 31 has a feed outlet 39 with an oval-shaped cross-section defined by a longitudinal side 40 and a transverse side 41, with the ratio of the lengths of the longitudinal side 40 to the transverse side 41 amounting to at least 1.25. The use of such metering elements is in particular suitable for applications in which the additive should be introduced into the fluid, viscous or pasty composition with a minimal number of metering elements 31. Fewer metering elements 31 are thus required for the feed of the same volume flow and additives. This variant is more cost effective because it is easier to manufacture and is in particular suitable for applications with low pressures up to medium pressures.

In accordance with a further variant, the metering element 31 has a feed cross-section 39 which includes convex and/or concave marginal curves 42 sectionally and/or straight longitudinal sides 40 sectionally. A larger surface than with the first-named variant of metering element can be covered using a metering element of this type. With the use of banana-shaped metering elements, a better durability of the metering elements is moreover observed at medium to higher pressures (approx. 30 to 50 bar) than with metering elements in accordance with the preceding variant when the surface covered by the metering elements is used as the reference parameter.

The metering element 31 advantageously has a porous or capillary-like structure. A metering element 31 of this type can be held in the recess 32 either in a force transmitting manner by means of a press fit or in a shape matched manner by the geometric design of the recess 32 into which the metering element is fitted with the corresponding mating geometrical shape and/or can be connected to the passage section (29, 30) in a firmly bonded manner (that is in particular by a weld connection or solder connection). The cross-section is made cylindrical, conical, sectionally cylindrical and/or conical with sectionally different diameters in a section parallel to the main axis of the metering element 31.

An essential aspect is the necessity not to arrange the metering elements 31 in the proximity of the connections 38 which connect adjacent passage sections to one another in a non-releasable manner. Each arrangement in the region of the connections results in a weakening of the connection. If it is a question of weld seams, the problem exists, on the one hand, that the metering elements can consist of a different material from the passage section (29, 33, 34) so that a weld connection is already difficult to manufacture due to the material pairing. In addition, porous metering elements or metering elements provided with capillary passages are to be considered per se as components which have a reduced strength due to the inherent weaknesses. If a metering element of this type has to absorb additional strains due to a weld process, microcracks in the metering element can already form at this point in time. In operation, additional strains also arise due to the pressure of the moulding composition. If a reciprocating screw, in particular an oscillating reciprocating screw is additionally used for the conveying of the fluid or pasty composition, periodic strain fluctuations additionally occur which are introduced into the weld seams. This permanent cycling results in crack spread and in the failure of the passage section, in particular when moulding compositions are to be processed under high pressures. For this reason, the portion of the surface of the passage section taken up by the metering elements should not exceed 20% at a maximum operating pressure of 1000 bar.

The following configurations were in particular realised in a construction aspect and were tested at a maximum operating pressure of 1000 bar.

|  | 1 | 2 | 3 | 4 |
| --- | --- | --- | --- | --- |
| Pin surface (mm$^2$) | 613.3 | 1070.9 | 1698 | 2221.9 |
| Case surface (mm$^2$) | 4021.2 | 5805.6 | 8625.6 | 12271 |
| Pin diameter (mm) | 5.2 | 7.5 | 8.8 | 10.8 |
| Abs. pin spacing min. (mm) | 7.26 | 7.51 | 10 | 12.12 |
| Abs. pin spacing max. (mm) | 9.41 | 10.25 | 13.38 | 16.06 |
| Portion of pin surface to case surface (%) | 15.25 | 18.43 | 19.68 | 18.1 |
| Ratio of abs. pin spacing to pin diameter | 1.4-1.8 | 1.0-1.37 | 1.14-1.52 | 1.12-1.49 |

Figure 5B:
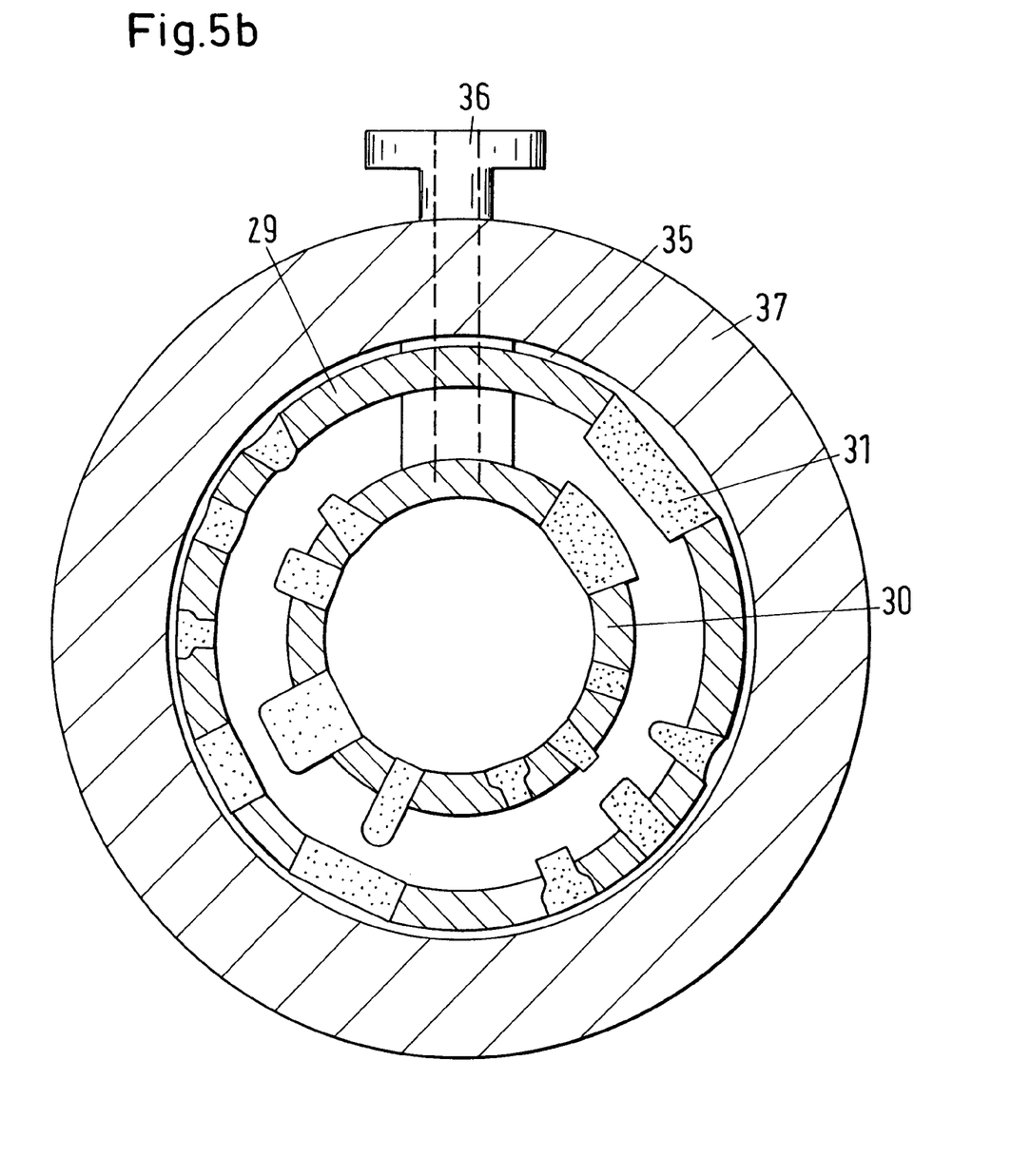

Referring to FIG. 5b, the metering elements 31 project into the interior of the flow passage containing the fluid or pasty composition. A feed of additive into a wider marginal region is already achieved by means of metering elements of this type so that a molding composition with a high additive concentration is obtained in a wider marginal region. In addition, the metering elements 31 can be arranged offset sequentially in the flow passage or metering elements can be arranged sequentially in at least two different designs such as shown in FIG. 4a, FIG. 4b, FIG. 5a, FIG. 5b, FIG. 6, FIG. 7. It is not shown in FIG. 5b to arrange a mixing element in the flow passage between the passage section 29 and the passage section 30. A mixing element of this type can be made, for example, similar to the mixing elements made in EP 1153650 A1.

Figure 6:
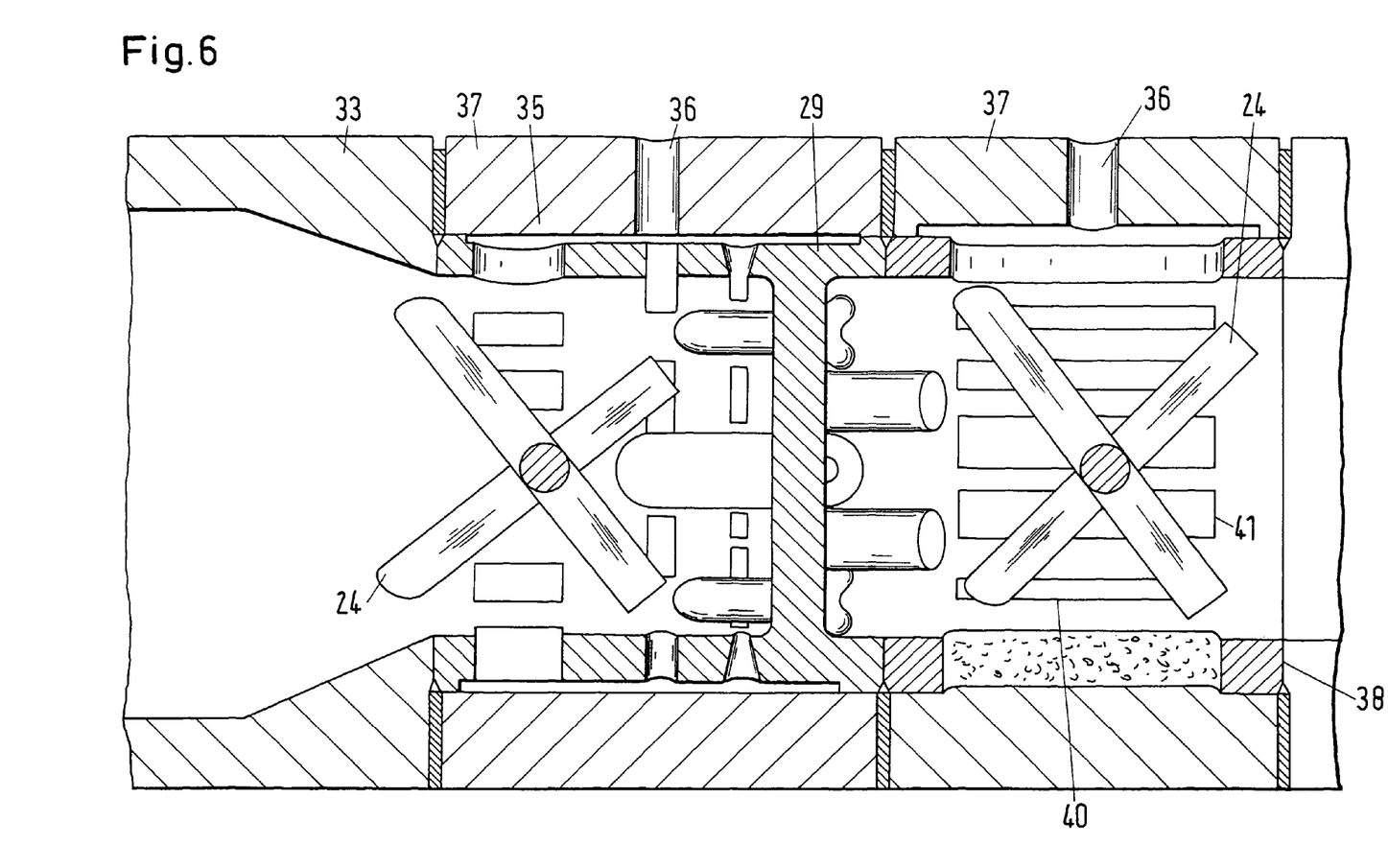
FIG. 6 illustrates a longitudinal section through a further embodiment for a metering device with metering elements with an elongate structure and mixing elements in the metering device.

Referring to FIG. 6, wherein like reference characters indicate like parts as above, the metering device has metering elements with an elongate structure and mixing elements arranged in the metering device. The function of components which have already been described in the preceding Figures shall not be looked at in any more detail at this point. It is possible to shorten the mixing distance with the help of the embodiment shown in FIG. 6. In addition, metering elements can also be provided which project into the interior space of the flow passage so that an additional mixing of additive and fluid or pasty composition can in particular take place in the marginal flow regions.

Figure 7:
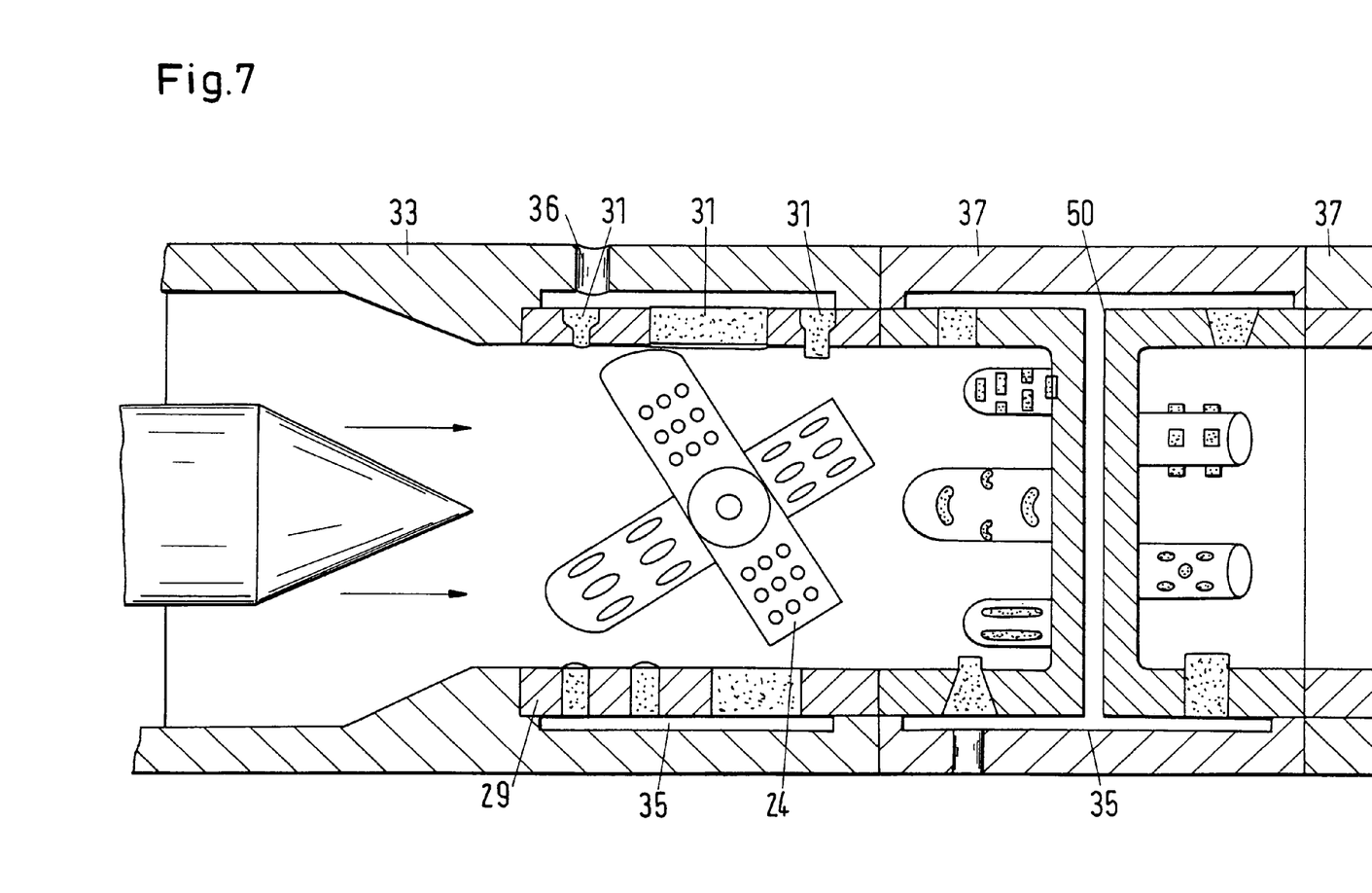
FIG. 7 illustrates a metering element which is integrated into a mixing element.

Referring to FIG. 7, wherein like reference characters indicate like parts as above, a metering element may be integrated into a mixing element 24. The mixing elements 24 shown in FIG. 4a, FIG. 4b, FIG. 5a, and FIG. 6 are provided with a distributor passage 50 which is located as a bore in the interior of the mixing element. The solution in accordance with FIG. 7 is in particular suitable to feed an additive into a flow passage of large diameter uniformly with immediate mixing effect.

A further possibility, not shown in detail here, can be used with flow passages of a large diameter. The flow is split into a plurality of part passages extending parallel to one another, which was already looked at, for example, in the still unpublished EP 06405129.5 which is incorporated herein in its totality as an integral part of this application.

What is claimed is:

1. A method for the manufacture of a molding composition from a raw material melt which is charged with an additive including the steps of
    plasticising a flow of a raw material selected from the group consisting of a liquid composition, a viscous liquid composition, a gooey pasty composition, a granulate and an elastomer strip within a cylinder of a conveyor apparatus containing at least one of a rotating screw and a reciprocating screw into a raw material melt;
    passing the melt through a passage section arranged inside the cylinder and disposed downstream of the screw;
    metering an additive through a plurality of metering elements placed in the passage section wherein the step of metering the additive includes passing the additive from a supply passage through an annular passage extending between the cylinder and the passage section and in communication with the metering elements for metering of the additive from the annular passage into the raw material melt through the metering elements, and wherein each metering element of the plurality of metering elements is arranged in a spaced apart relationship to a neighboring metering element of the plurality of metering elements such that the plurality of metering elements are distributed around the periphery of the passage section;
    mixing of the raw material melt with the additive subsequent to said step of metering to produce a molding composition, with the molding composition being present as a homogeneous mixture of the raw material melt with the additive; and
    discharging of the molding composition from the conveyor apparatus.

2. A method in accordance with claim 1 wherein said step of
    plasticising includes heating of the raw material into the raw material melt.

3. A method in accordance with any one of claims 1 and 2 further comprising the step of supplying the molding composition to an injection molding machine.

4. A method in accordance with any one of claims 1 and 2 further comprising the step of subjecting the molding composition on a continuous basis to an extrusion process.

5. A method in accordance with claim 4 wherein the extrusion process is selected from the group consisting of a blow extrusion process, an extrusion blow molding process, a blow film extrusion process, a profile extrusion process, a film extrusion process, a tube extrusion process, a plate extrusion process, a foam extrusion process and a process for the manufacture of liquid silicon rubber.

6. A method in accordance with any one of claims 1 and 2 further comprising the step of processing the molding composition to form a molded part in a combination process of an injection molding process and an extrusion process.

7. A method in accordance with any one of claims 1 and 2 further comprising the step of processing the molding composition continuously in an injection unit to form a strand.

8. A method in accordance with claim 7 wherein an excess amount of the molding composition in the injection unit is periodically held in a storage space of variable volume.

9. A method in accordance with any one of claims 1 and 2 further comprising the step of injecting the molding-composition batch-wise into a cavity of a molding tool to manufacture molded parts.

10. A method in accordance with any one of claims 1 and 2 wherein said step of discharging includes a step-of metering the molding composition from the conveyor apparatus.

11. A method in accordance with claim 10 wherein said step of discharging further includes a step of pressurizing the molding composition being metered from the conveyor apparatus.

12. A method in accordance with claim 11 wherein the molding composition is metered from the conveyor apparatus through a throttle nozzle.

13. A method for the manufacture of a molding composition Including the steps of
    charging a flow of a raw material through a first passage section of a conveyor apparatus;
    conveying the raw material in the passage section by one of a rotatable screw and a reciprocating screw contained in the passage section;
    plasticising the raw material into a raw material melt within the first passage section;
    thereafter conveying the raw material melt into a second passage section containing a plurality of metering elements;
    supplying a foaming agent into the raw material melt in the second passage section by metering the foaming agent through the plurality of metering elements arranged in the second passage section to charge the raw material melt with the foaming agent whereby each metering element of said plurality of metering elements is arranged in spaced relationship to a neighboring metering element of said plurality of metering elements whereby the plurality of metering elements are distributed around the circumference of the second passage section;
    mixing the foaming agent with the raw material melt subsequent to said step of supplying to form a molding composition with the molding composition being present as a homogeneous mixture of the raw material melt with the foaming agent;
    increasing the pressure in the conveyor apparatus continuously during said step of mixing to form the molding composition;
    discharging of the molding composition from the conveyor apparatus;

continuously conveying the molding composition towards a needle-type shut-off nozzle which closes an inlet opening into a cavity of a molding tool; and opening the shut-off nozzle in response to the molding composition reaching a predetermined injection pressure to allow the molding composition to enter into the cavity of the molding tool until the molding composition fills the cavity and the pressure of the molding composition falls so far that the foaming agent dissolved in the molding composition expands and a foamed molded part is created.

14. A method in accordance with claim 13 wherein the foaming agent is supplied in one of a gaseous, liquid and over-critical state.

15. A method in accordance with claim 13 wherein the foaming agent is supplied through the plurality of metering elements at a pressure of 1000 bar.

* * * * *